United States Patent
Feng et al.

(10) Patent No.: US 9,920,916 B2
(45) Date of Patent: Mar. 20, 2018

(54) CARD TYPE LED DRIVER AND TRANSPORTATION MEANS WITH CARD TYPE DRIVER

(71) Applicant: SICHUAN SUNFOR LIGHT CO., LTD., Sichuan, Chengdu (CN)

(72) Inventors: Zhengyong Feng, Chengdu (CN); Dongming Li, Chengdu (CN); Mian Yang, Chengdu (CN); Wentao Long, Chengdu (CN)

(73) Assignee: Sichuan Sunfor Light Co., Ltd., Chengdu (CN)

( * ) Notice: Subject to any disclaimer, the term of this patent is extended or adjusted under 35 U.S.C. 154(b) by 0 days.

(21) Appl. No.: 15/039,340

(22) PCT Filed: Nov. 25, 2014

(86) PCT No.: PCT/CN2014/092153
§ 371 (c)(1),
(2) Date: May 25, 2016

(87) PCT Pub. No.: WO2015/078354
PCT Pub. Date: Jun. 4, 2015

(65) Prior Publication Data
US 2017/0159919 A1    Jun. 8, 2017

(30) Foreign Application Priority Data

Nov. 26, 2013    (CN) .......................... 2013 1 0608195

(51) Int. Cl.
*F21K 9/23*    (2016.01)
*F21K 9/238*    (2016.01)
(Continued)

(52) U.S. Cl.
CPC .......... *F21V 23/005* (2013.01); *F21V 17/101* (2013.01); *F21V 17/12* (2013.01);
(Continued)

(58) Field of Classification Search
CPC ... F21K 9/23; F21K 9/238; F21K 9/27; F21Y 2115/10; F21Y 2101/00; F21Y 2105/10;
(Continued)

(56) References Cited

U.S. PATENT DOCUMENTS 5,994,845 A * 11/1999 Gibboney, Jr. .......... H02H 9/02
315/185 R
9,374,859 B2 * 6/2016 Pop ..................... H05B 33/0815
(Continued)

FOREIGN PATENT DOCUMENTS

| CN | 102798021 A | 11/2012 |
| CN | 203115737 U | 8/2013 |
| CN | 103281482 A | 9/2013 |

OTHER PUBLICATIONS

International Search Report of International Application No. PCT/CN2014/092153 dated Feb. 17, 2015.

*Primary Examiner* — Douglas W Owens
*Assistant Examiner* — Wei Chan
(74) *Attorney, Agent, or Firm* — Michael Ye; Andrews Kurth Kenyon LLP (57) ABSTRACT

The present invention relates to a card type LED driver and transportation means with the card type driver, characterized in that the card type LED driver includes an installation card tray and a replaceable driving circuit board, the installation card tray being secured to an LED module or an LED lamp with the LED module so as to drive and/or control the LED module through an electrical interface in the installation card tray; the replaceable driving circuit board has at least one AC directly driven LED driving unit, the replaceable driving circuit board being pluggably secured to the installation card tray, thus making possible selectively installing a corresponding replaceable driving circuit board according to (Continued)

lighting scenario requirements, dimming requirements, and electrical characteristics of the LED module.

20 Claims, 5 Drawing Sheets (51) Int. Cl.
*F21V 23/00* (2015.01)
*H05B 33/08* (2006.01)
*F21V 17/12* (2006.01)
*F21V 17/10* (2006.01)
*F21Y 115/10* (2016.01)

(52) U.S. Cl.
CPC ......... *H05B 33/083* (2013.01); *H05B 33/089* (2013.01); *H05B 33/0815* (2013.01); *H05B 33/0845* (2013.01); *H05B 33/0857* (2013.01); *F21Y 2115/10* (2016.08)

(58) Field of Classification Search
CPC ............. F21Y 2107/20; F21Y 2115/15; H05B 37/0272; H05B 33/0842; H05B 33/0803; H05B 33/0857; F21V 23/006; F21V 23/007
USPC ..................................... 315/149, 294, 34, 51
See application file for complete search history.

(56) References Cited

U.S. PATENT DOCUMENTS

| | | | |
|---|---|---|---|
| 2004/0242029 A1* | 12/2004 | Nakamura | G06K 19/077 439/66 |
| 2006/0141851 A1* | 6/2006 | Matsui | F21K 9/00 439/490 |
| 2007/0176912 A1* | 8/2007 | Beames | G09G 5/363 345/204 |
| 2007/0294440 A1* | 12/2007 | Haku | G06F 13/385 710/62 |
| 2010/0118148 A1* | 5/2010 | Lee | F21V 3/00 348/164 |
| 2011/0238880 A1* | 9/2011 | Hirayama | G06F 13/385 710/301 |
| 2011/0291581 A1* | 12/2011 | Khalsa | H05B 41/295 315/246 |
| 2012/0032594 A1* | 2/2012 | Hagner | B60Q 1/085 315/82 |
| 2012/0051050 A1* | 3/2012 | Lee | F21S 2/005 362/235 |
| 2012/0120662 A1* | 5/2012 | Duong | H01L 33/58 362/268 |
| 2014/0071655 A1* | 3/2014 | Wang | F21K 9/56 362/84 |
| 2015/0289349 A1* | 10/2015 | Kim | F21K 9/23 315/34 |

* cited by examiner

CARD TYPE LED DRIVER AND TRANSPORTATION MEANS WITH CARD TYPE DRIVER

The present application is a National Stage Application of PCT/CN2014/092153, filed Nov. 25, 2014, which claims priority of Chinese Patent Application No. 201310608195.3, filed Nov. 26, 2013. The entirety of the aforementioned applications is incorporated herein by reference.

TECHNICAL FIELD

The present invention relates to an LED driver and a transport, and more particularly, to a card type LED driver and a transport having the card type driver.

BACKGROUND

As a new generation high efficiency light source, LEDs have advantages such as long lifetime, low energy consumption, environment friendliness and the like, and thereby have been widely applied in lighting of industrial, agricultural and commercial fields.

Existing driving power sources for lighting-purpose LED lamps can be classified into two types, i.e., external and built-in driving power sources. In the external type, a light source is directly mounted on a heat dissipator and then is connected to a driver via a power line. However, such connection is inclined to be disconnected and the outer sheath of the power line is inclined to be damaged. As a result, dangers such as short circuit and current leakage may occur. For example, most tube lights are connected like this with the power sources disposed externally, or in some tube lights, the driving power sources are mounted in a cavity of a fixed holder, for example, T8/T5 tubes with external power sources.

Among various lamps with built-in power sources, one type is that a power source cavity is provided on the lamp for mounting the driving power source, for example, street lamps, garden lamps and the like, and another type is that the power source is directly positioned in an internal cavity, for example, bulb lamps.

The above power source mounting methods have the same problems. For example, connections during mounting are inconvenient, and the designed cavities for mounting driving power sources cannot be standardized due to prominent differences in sizes of power sources of different powers.

Figure 1:
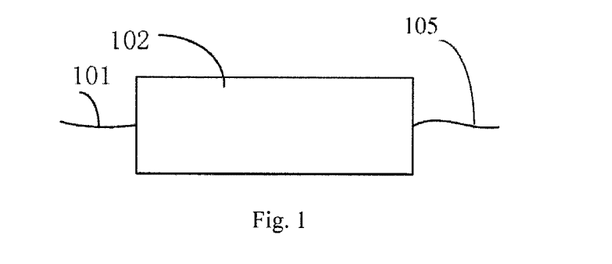
FIG. 1 is a schematic diagram showing a structure of a conventional LED driver.
Figure 2:
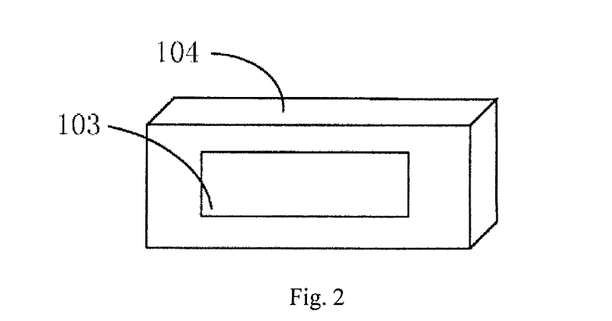
FIG. 2 is a schematic diagram showing a mounting cavity for a conventional LED driving power source.

FIG. 1 is a schematic diagram showing a structure of a conventional LED driver. The driver is formed by an input lead (or an input lead terminal), a circuit board, a housing, an output lead (or an output lead terminal). FIG. 2 is a schematic diagram showing a typical mounting interface for mounting an LED driver. The mounting interface is formed by a housing with a cavity.

As can be seen from the above descriptions, the existing LED lamps require complicated assembling methods, and most damages or no goods in these LED lamps at present are power source failures. In the assembling methods for external power sources, the power sources cannot be replaced, or non-professionals are not capable of replacing the power sources. In the assembling methods for the built-in power sources, the power sources cannot be repaired once they have malfunctions. CN203115737U discloses an LED street lamp having a driver which is convenient to replace. However, the replacement procedure is still relatively complicated, and the driver cannot meet the miniaturization requirements.

SUMMARY

Aiming at the above problems, the present invention provides a replaceable card type LED driver which is small sized versatile.

The present disclosure provides a card type LED driver, including: a card tray fixed onto an LED module or an LED lamp having an LED module so that the LED module is driven and/or controlled via an electrical interface in the card tray; and a replaceable driver circuit board having at least one LED driver unit which is capable of being directly driven by alternating current; wherein the replaceable driver circuit board is fixed to the card tray by insertion, so that corresponding replaceable driver circuit boards can be selectively mounted according to lighting requirements, dimming requirements and electrical properties of the LED module.

According to an optional embodiment, the replaceable driver circuit board further includes metal conductive bars and a base board, and the LED driver unit and the metal conductive bars are provided on the base board; the replaceable driver circuit board further includes a housing defining boundaries of the base board.

According to an optional embodiment, the housing has a bevel at a front end thereof, and at least one of both sides of the housing is provided with a groove.

According to an optional embodiment, the housing is formed by injection molding, and the base board is stuck in the housing; or the base board is directly plastic-packaged by the housing so that the housing is fixed with the base board.

According to an optional embodiment, the card type LED driver further includes an intelligent control chip group and an interface chip group.

According to an optional embodiment, relevant electronic elements in the intelligent control chip group and the interface chip group are directly mounted on a surface of the base board.

According to an optional embodiment, the interface chip group includes a wireless communication transceiver therein.

According to an optional embodiment, the metal conductive bars serve as electrical interfaces of the replaceable driver circuit board, and the number of the metal conductive bars is at least two.

According to an optional embodiment, the card tray includes a body, a block sheet, a conductive spring sheet and a buckle.

According to an optional embodiment, the groove of the replaceable driver circuit board and the buckle of the card tray detachably engage with each other so that the replaceable driver circuit board is fixed in the card tray.

According to an optional embodiment, the metal conductive bars of the replaceable driver circuit board tightly contact the conductive spring sheets of the card tray to realize electrical connections between the replaceable driver circuit board and the card tray.

According to an optional embodiment, the LED driver unit includes at least one of driver circuits for different powers, dimming circuits, and driver circuits for different color temperatures.

The present invention discloses an LED lamp, including a light source circuit board, a case, a light homogenizer plate, an upper cover and a mounting sheet; wherein the LED lamp has a card type LED driver as mentioned above.

According to an optional embodiment, the case is provided with a mounting hole, and the mounting sheet is provided with a hole.

According to an optional embodiment, the card tray is mounted on a side wall of the case.

According to an optional embodiment, the light source circuit board is fixed inside the case by a screw, the light homogenizer plate is mounted on the case by an adhesive, the upper cover is mounted on the case for fastening the light homogenizer plate, the hole in the mounting sheet is aligned with the mounting hole in the case so that the mounting sheet is fixed on the case by a screw.

According to an optional embodiment, the case has four side surfaces, among which two opposite surfaces are at least provided with two mounting sheets.

The present invention discloses a transport, including a card type LED driver as mentioned above.

According to an optional embodiment, a flash memory is built in the replaceable driver circuit board of the card type LED driver, and software updating can be realized by re-writing the program.

The present invention discloses a transport, including an LED lamp as mentioned above.

The present invention has the following advantages:

1. The LED driver in the present invention is manufactured as a card-like structure, and thus miniaturization of the LED lamp driver can be realized.

2. The miniaturization of the LED driver allows more design spaces for light distribution and heat dissipation of the entire lamp.

3. By providing a card tray having a standard interface in an LED lamp, the driver circuit can be replaced as required, and the power can be selected according to actual demands. For example, the technical solutions in the present invention can provide more selections for users whose cars have modified lamps.

4. The driver circuit board can have a built-in flash memory, and thus software can be quickly updated by re-writing the program, which is like read and write of a SD card. As a result, using the technical solutions in the present invention, site operation becomes easy.

5. The card type LED driver in the present invention has built-in micro-processor/control chips, and thus intelligent controls on the lamps can be simply achieved, for example, a single lamp control, or controls after accessing a control network.

6. Even if a lamp or an LED module is damaged, the lamp or the LED module can be individually replaced, thereby bringing convenience in maintenance and reduction in usage costs of consumers.

7. Independent manufacturing and design of lamps or LED modules can be realized.

8. If the card type LED driver in the present invention is applied in a transport, the weight of the transport itself can be reduced, and thus effective load of the transport can be increased, and meanwhile energy saving and reduction in manufacturing and usage costs can be achieved.

| Listing of reference signs: | |
|---|---|
| 100: card type LED driver | 200: card tray |
| 101: output lead | 102: conventional LED driver |
| 103: mounting interface of the LED driver | 104: housing with a cavity |
| 105: output lead | 201: metal conductive bars |
| 202: base board | 203: housing |
| 204: LED driver unit | 205: intelligent control chip group |
| 206: interface chip group | 207: slot body |
| 208: block sheet | 209: conductive spring sheet |
| 210: replaceable driver circuit board | 211: buckle |
| 301: bevel | 302: groove |
| 401: light source module | 402: PCB |
| 403: power supplying socket | 501: light source circuit board |
| 503: case | 505: light homogenizer plate |
| 506: upper cover | 601: mounting hole |
| 602: hole | 701: mounting sheet |

DETAILED DESCRIPTION

The present disclosure will be described in detail with reference to drawings.

Figure 3:
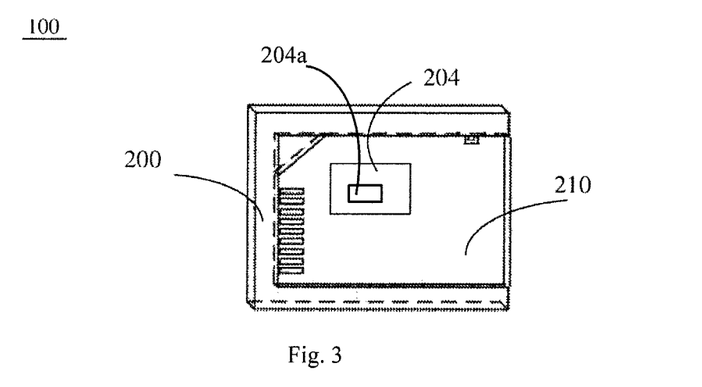
FIG. 3 is a schematic diagram showing a structure of a card type LED driver in the present invention.

FIG. 3 is a schematic diagram showing a structure of a card type LED driver of the present disclosure. The card type LED driver 100 in FIG. 3 includes a card tray 200 and a replaceable driver circuit board 210. The card tray 200 is fixed onto an LED module or an LED lamp having an LED module so that the LED module is driven and/or controlled via an electrical interface in the card tray 200. The replaceable driver circuit board 210 has at least one LED driver unit 204 which is capable of being directly driven by alternating current. The replaceable driver circuit board 210 can be fixed to the card tray by insertion, so that corresponding replaceable driver circuit boards 210 can be selectively mounted according to lighting requirements, dimming requirements and electrical properties of the LED module.

Figure 4:
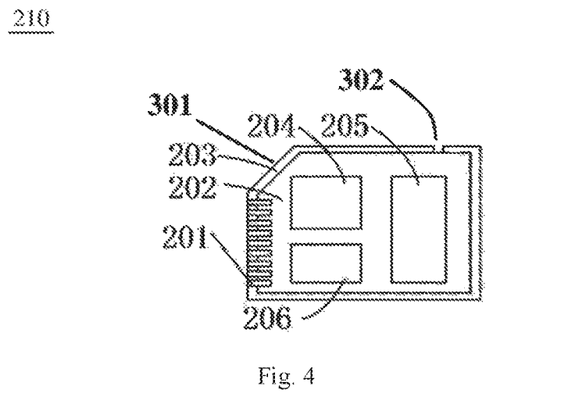
FIG. 4 is a schematic diagram showing a basic structure of a replaceable driver circuit board in the present invention.

FIG. 4 is a schematic diagram showing a basic structure of a replaceable driver circuit board in the present invention. FIG. 4 is intended to show a basic structure of the replaceable driver circuit board 210 in the present invention. The replaceable driver circuit board 210 includes a plurality of metal conductive bars 201 (also called as touch fingers), a base board 202, a housing 203, and an LED driver unit 204. The metal conductive bars 201 and related electronic elements of the LED driver unit 204 are directly mounted on a surface of the base board 202. The base board 202 is disposed on the housing 203 so that the replaceable driver circuit board 210 is manufactured into a card type structure which is linearly drivable by high voltages and has an appearance like a SD card. By manufacturing the driver circuit board into a card type structure like a SD card, the miniaturization of the LED driver can be achieved. Also, the miniaturization of the LED driver allows more design spaces for light distribution and heat dissipation of the whole lamp.

The metal conductive bars 201 are the electrical interfaces of the replaceable driver circuit board 210 in the present invention, and include two or more bars. The electrical interfaces formed by the metal conductive bars 201 are similar to the gold finger interface of a PCI.

A bevel is provided at a front end of the base board 202. Such bevel may be provided at any position at the front end of the base board without being limited to the position as shown in FIG. 4. Further, a plurality of bevels may be provided. A bevel 301 is provided at a front end of the housing 203 for matching the bevel at the front end of the base board 202. The bevel 301 as shown is used for indicating the insertion direction for inserting the card type LED driver so that the card type LED driver will not be inserted along an opposite direction. At least one of both sides of the housing 203 is provided with a square-shaped groove 302. The groove 302 engages with a buckle 211 of the card tray 200 during assembling to form a detachable buckle connection structure, and then the card type LED driver can be fixed.

The housing 203 can be formed by injection molding as a housing which is capable of being assembled with the base board 202. Alternatively, the base board 202 can be directly plastic-packaged by the housing 203 so that the housing 203 is fixed with the base board 202 to form an entirety. One basic structure of the replaceable driver circuit board 210 may include an intelligent control chip group 205 and an interface chip group 206. Related electronic elements of the intelligent control chip group 205 and the interface chip group 206 can be directly mounted on a surface of the base board 202. By providing the intelligent control chip group 205 and the interface chip group 206 in the replaceable driver circuit board 210, intelligent controls on the LED lamp can be achieved, including a single lamp control and controls after accessing a control network. Also, a wireless communication transceiver can be provided in the interface chip group 206 so as to control the LED wirelessly.

Figure 5:
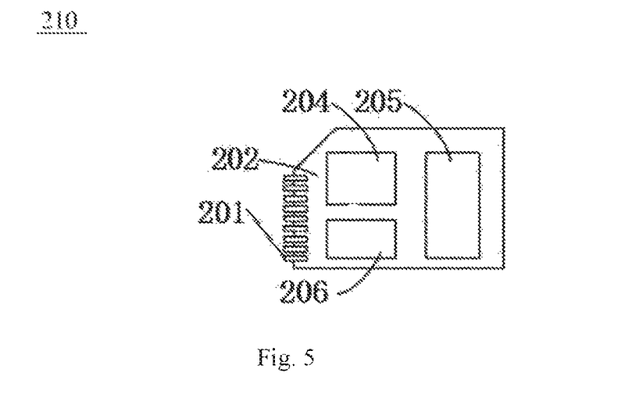
FIG. 5 is a schematic diagram showing a simplified structure of a replaceable driver circuit board in the present invention.

FIG. 5 is a schematic diagram showing a simplified structure of the replaceable driver circuit board in the present invention. FIG. 5 is intended to show another simplified structure of the replaceable driver circuit board 210 in the present invention. As compared with the basic structure in FIG. 4, the simplified structure in FIG. 5 lacks the housing 203. That is, the structure in FIG. 5 equals to a bare version of the basic structure in FIG. 4. In the simplified structure in FIG. 5, the metal conductive bars 201 may be manufactured as the gold finger interfaces like PCI, or may be manufactured as solderable solder joints like surface mounting technologies. In the simplified structure in FIG. 5, the replaceable driver circuit board 210 may be directly surface-mounted or soldered on a carrier board, or may be directly inserted into the card tray 200.

The LED driver unit 204 in the replaceable driver circuit board 210 of the present invention may include at least one 204a of driver circuits for different powers, dimming circuits, and driver circuits for different color temperatures.

Figure 7:
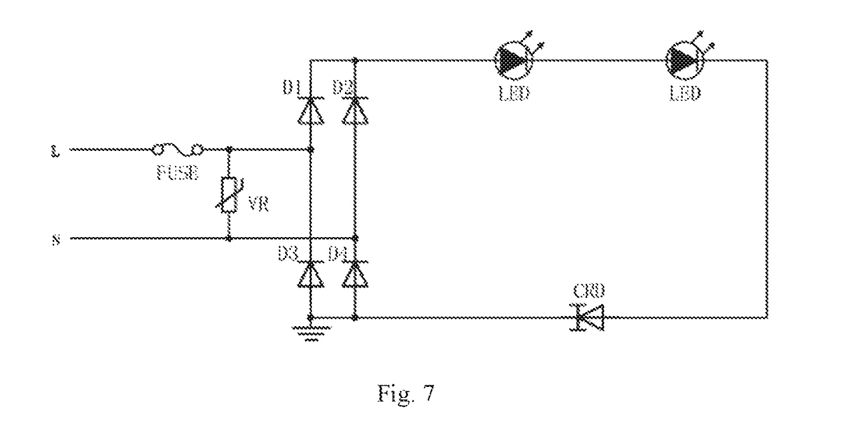
FIG. 7 is a schematic diagram showing basic principles of a preferable LED driver circuit in the present invention.

FIG. 7 is a schematic diagram showing basic principles of a preferable basic circuit of the LED driver unit 204. The driver unit 204 includes an input protective unit, a rectifier unit (composed of D1, D2, D3 and D4), and a constant current unit (CRD). One terminal of the fuse is connected to a power supply input terminal L. Another terminal of the fuse and one terminal of the voltage-stabilization diode VR are connected to an input terminal of the rectifier unit. Another terminal of the voltage-stabilization diode VR is connected to another power supply input terminal N and another input terminal of the rectifier unit. A positive terminal of a rectifier diode D1 is connected to a negative terminal of a rectifier diode D3, and a power supply connection point is disposed between D1 and D3. A positive terminal of the rectifier diode D2 is connected to a negative terminal of a rectifier diode D4, and a power supply connection point is disposed between D2 and D4. The negative terminals of the rectifier diodes D1 and D2 are connected to function as a positive output terminal of the rectifier unit, and meanwhile function as a positive output terminal of the LED driver to be connected to a positive terminal of a LED string. The positive terminals of the rectifier diodes D3 and D4 are connected to function as a negative output terminal of the rectifier unit. A negative terminal of the constant current unit CRD (i.e., the constant regulative diode) is connected to the negative terminal of the rectifier unit, and a positive terminal of the constant current unit CRD is connected to a negative terminal of the LED string. Actually, the LED string and the constant current unit are connected with each other in series and then connected between the positive and negative terminals of the rectifier unit. The LED string and the constant current unit are arranged in no particular order.

The constant current unit CRD may be a single constant current diode or an equivalent circuit element having other structures.

Figure 8:
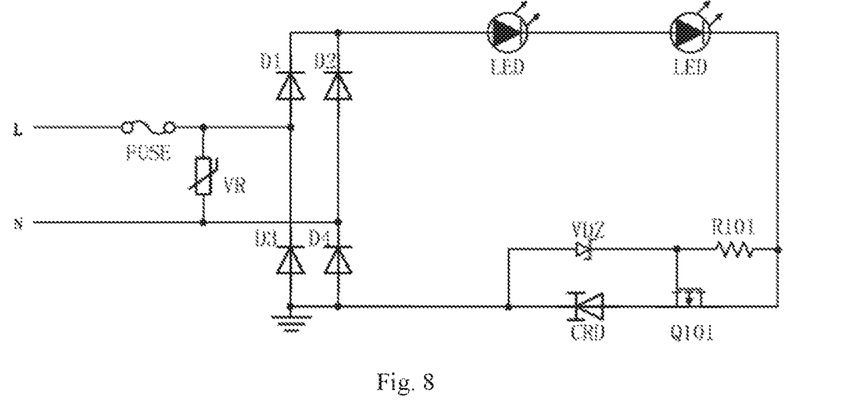
FIG. 8 is a schematic diagram showing basic principles of another preferable LED driver circuit in the present invention.

FIG. 8 is a schematic diagram showing another preferable driver circuit structure of the LED driver unit 204. The difference between the circuits in FIGS. 7 and 8 lies in that a MOSFET is employed as a power device, and a voltage-stabilization diode is used to limit the source voltage of the MOSFET. Thus, the power consumption on the CRD (constant regulative diode) is reduced, and thereby the reliability of the whole circuit is improved.

Figure 9:
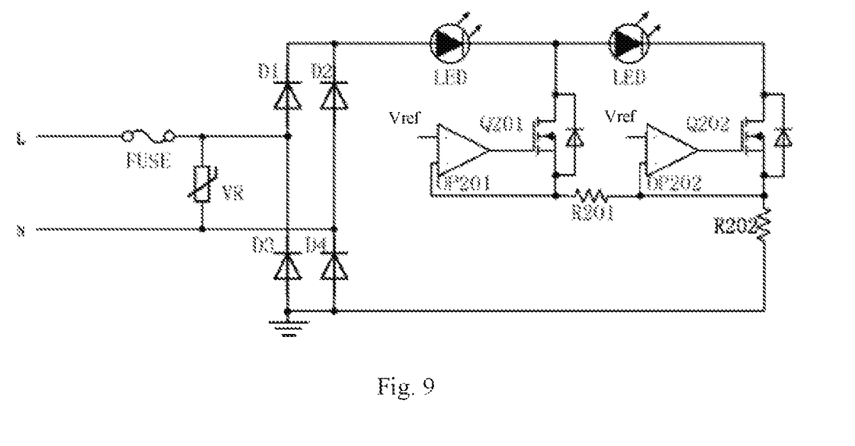
FIG. 9 is a schematic diagram showing basic principles of another preferable LED driver circuit in the present invention.

FIG. 9 is a schematic diagram showing basic principles of another preferable LED driver circuit in the present invention. The circuit topology after the rectifier bridge in FIG. 9 is different from that in FIG. 7. FIG. 9 shows the simplest application circuit in which LEDs are lightened sequentially, and LEDs are divided into two parts. A positive terminal of an operation amplifier OP201 is connected to a reference voltage source, and a negative terminal of the operation amplifier OP201 is connected to a source of a switch Q201. A gate of the switch Q201 is connected to an output terminal of the operation amplifier OP201. A drain of the switch Q201, serving as a connection point between LEDs, is connected at a proper position between the LEDs in the string. A terminal of a resistor R201 is connected to the source of the switch Q201. Another terminal of the resistor R201 is connected to a negative terminal of an operation amplifier OP202. A positive terminal of the operation amplifier OP202 is connected to a reference voltage source. An output terminal of the operation amplifier OP is connected to a gate of a switch Q202. A drain of the switch Q202 is connected to a negative terminal of the LED string. A source of the switch Q202 is connected to the negative terminal of the operation amplifier OP202 and a terminal of a resistor R202. Another terminal of the resistor R202 is connected to the negative output terminal of the rectifier unit. When the input mains electricity is at a relatively low transient value, the LEDs cannot be conducted. With the increase of the transient value of the input voltage, a first part of the LED string is conducted. The first part of the LED string is connected in series with the switch Q201. If the instantaneous voltage continues to rise to make the whole LED string conducted, the switch Q202 is switched on, and the switch Q201 is switched off.

FIGS. 7, 8 and 9 show driver circuits of different powers and driving modes. People can replace replaceable driver circuit boards 210 according to actual requirements to arrive at LED modules or lamps of different powers and driving modes.

Figure 10:
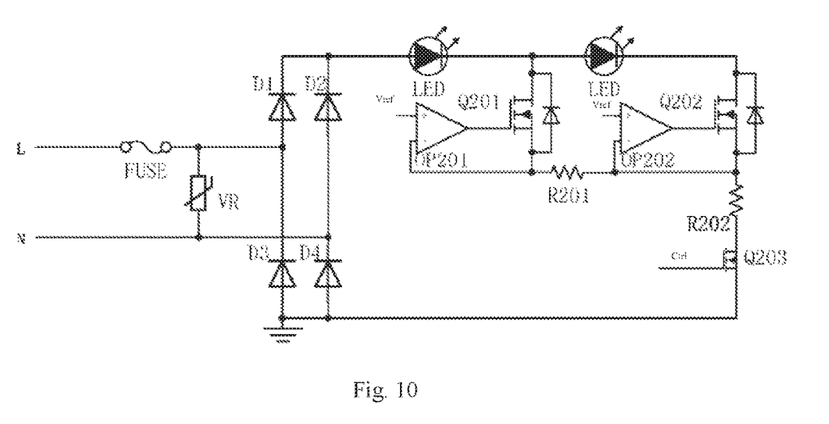
FIG. 10 is a schematic diagram showing basic principles of a dimmable LED driver circuit in the present invention.

FIG. 10 is a schematic diagram showing basic principles of a dimmable LED driver circuit in the present invention. As compared with the LED driver circuit in FIG. 9, in the circuit in FIG. 10, a switch Q203 is connected in series between the resistor R202 and the negative terminal of the rectifier unit. A source of the switch Q203 is connected to the negative output terminal of the rectifier unit, and a drain of the switch Q203 is connected to another terminal of the resistor R202. By inputting an external control signal to the control terminal of the switch, the dimming may be realized by the control signal. The control signal can be directly input by an external controller, or an external communication signal can be transferred to the intelligent control chip group 205 via the interface chip group 206, and then converted into a PWM signal capable of directly controlling on and off of the switch Q203.

Figure 11:
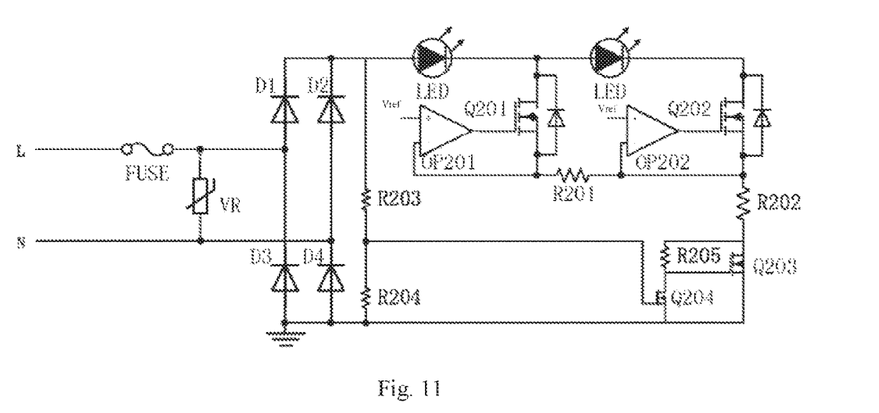
FIG. 11 is a schematic diagram showing basic principles of another dimmable LED driver circuit in the present invention.

FIG. 11 is a schematic diagram showing basic principles of another dimmable LED driver circuit in the present invention. When such dimming circuit is employed, the card type LED driver 100 does not include the interface chip group 206 or the intelligent control chip group 205. The LED lamp using this driver circuit can support TRIAC direct series dimming. The difference between the circuits in FIGS. 11 and 10 lies in that a low voltage detection circuit is added into the front stage of the circuit. When the dimming phase is relatively low, the corresponding transient voltage is relatively low, and the switch Q203 is switched off. Consequently, LED lamp flicker when the dimming phase is relatively low can be avoided. A terminal of a resistor R203 is connected to the positive output terminal of the rectifier unit, and another terminal of the resistor R203 and a terminal of a resistor R204 are connected to a gate of a switch Q204. A drain of the switch Q204 is connected to a terminal of a resistor R205 and a gate of the switch Q203. Another terminal of the resistor R205 is connected to the drain of the switch Q203. Another terminal of the resistor R204, a source of the switch Q204 and the source of the switch Q203 are connected to the negative output terminal of the rectifier unit.

Figure 12:
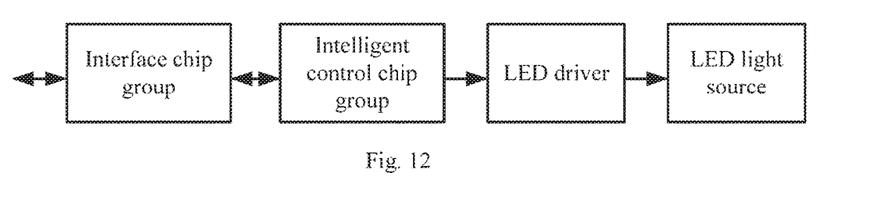
FIG. 12 is a working flowchart showing an intelligent dimming solution in the present invention.

FIG. 12 is a working flowchart showing an intelligent dimming solution in the present invention. An external signal is input to the card type LED driver 100 via the interface chip group 206. The interface chip group 206 converts the signal into a signal which can be processed by the intelligent control chip group 205. In systems where feedbacks are needed, the intelligent control chip group 205 may return a feedback signal via the interface chip group 206. The intelligent control chip group 205 processes the received signal to obtain a desired dimming signal, so as to realize controls on the LED driver. Consequently, the dimming of the LED can be realized.

FIGS. 10, 11 and 12 show different dimming solutions, and people can replace different replaceable driver circuit boards 210 according to actual requirements so as to arrive at different dimming effects.

In addition, by providing circuits for adjusting different color temperatures, color temperature adjustment can be achieved.

By providing one or more of driver circuits of different powers, dimming circuits, and driver circuits for different color temperatures in the LED driver unit 204, the powers can be selected, different dimming solutions can be achieved, and color temperatures can be adjusted.

Further, a flash memory can be built in the replaceable driver circuit board 210. By re-writing the program, software can be updated. This is similar to the reading and writing of a SD card, and is convenient for site operation.

Figure 6:
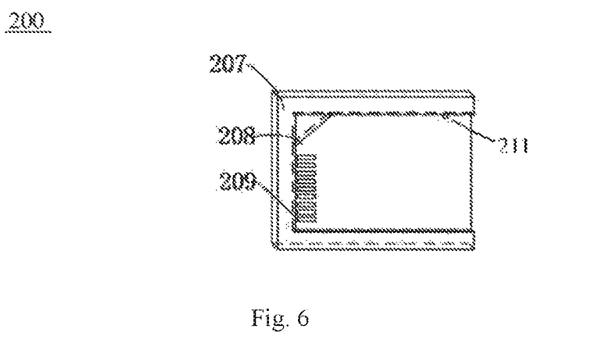
FIG. 6 is a schematic diagram showing a card tray of a card type LED driver in the present invention.

FIG. 6 is a schematic diagram showing a card tray of the card type LED driver in the present invention. The card tray 200 includes a body 207, a block sheet 208, a conductive spring sheet 209 and a buckle 211.

During mounting, the replaceable driver circuit board 210 is inserted into the card tray 200. The metal conductive bars 201 of the replaceable driver circuit board 210 tightly contact the conductive spring sheets 209 of the card tray 200 so as to realize electrical connections between the replaceable driver circuit board 210 and the card tray 200. The groove 302 of the replaceable driver circuit board 210 and the buckle 211 of the card tray 200 detachably engage with each other so that the replaceable driver circuit board 210 is fixed.

The card tray 200 is fixed onto an LED module or an LED lamp having an LED module so that the LED module is driven and/or controlled via an electrical interface in the card tray 200. The replaceable driver circuit board 210 can be fixed to the card tray 200 by insertion, so that corresponding replaceable driver circuit boards 210 can be selectively mounted according to lighting requirements, dimming requirements and electrical properties of the LED module. Consequently, LED powers, dimming solutions, and color temperatures can be selected.

In addition, the replaceable driver circuit board 210 in the present invention is attached to an LED module or an LED lamp having an LED module by insertion, and thus the LED module or the lamp can be designed and manufactured without much consideration on the LED driver. Consequently, the design and manufacturing of the lamp or LED module become more flexible and diversified.

Also, the replaceable driver circuit board 210 in the present invention is attached to an LED module or an LED lamp having an LED module by insertion, the driver circuit board can be selected and replaced as desired. When the driver circuit board, the lamp or the LED module is damaged, the driver circuit board, the lamp or the LED module can be replaced individually. Thus, maintenance is convenient and thereby usage costs of consumers are greatly reduced.

Figure 13:
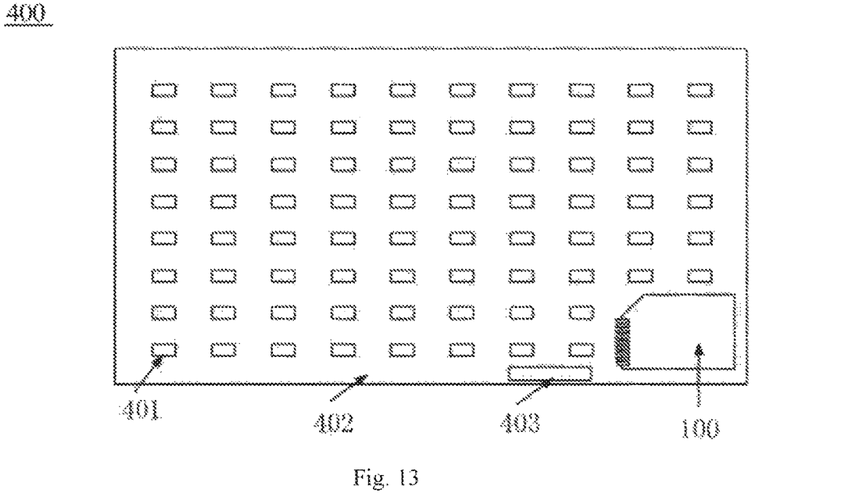
FIG. 13 is a schematic diagram showing an application scenario where a card type LED driver is applied in an LED module.

FIG. 13 shows an application scenario where the card type LED driver is applied in an LED module 400. The light source module 400 includes light source units 401, a PCB 402, a power supply socket 403 and the card type LED driver having a simplified structure in the present invention (as shown in FIG. 5). The light source units 401, the power supply socket 403 and the card type LED driver 100 having a simplified structure are mounted on the PCB 402. The card type LED driver 100 having a simplified structure is fixed on the PCB 402. The light source module 400 may be directly mounted as a background decoration light source, or may be used with proper housings to form a panel. Alternatively, such light module 400 can be applied in large surface light sources such as advertising lamp boxes.

Figure 14:
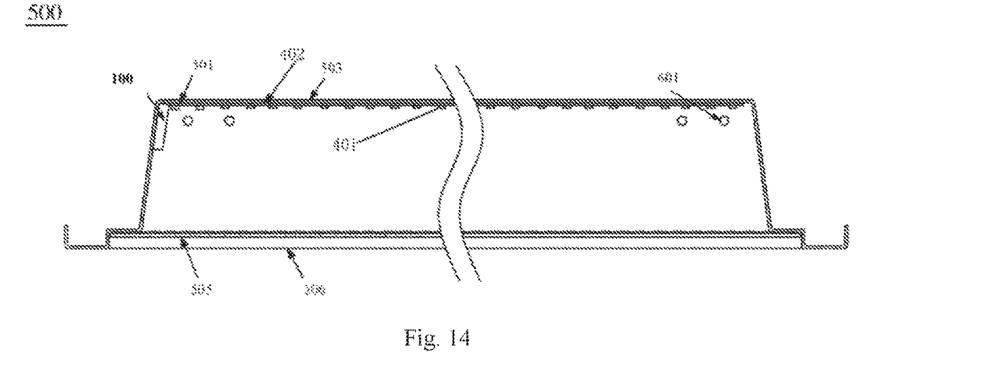
FIG. 14 is a schematic diagram showing an application scenario where a card type LED driver is applied in an LED lamp.

FIG. 14 shows an application scenario where the card type LED driver in the present invention is applied in an LED lamp 500. The LED lamp 500 includes a light source circuit board 501, a case 503, a light homogenizer plate 505, an upper cover 506 and a mounting sheet 701.

Figure 15:
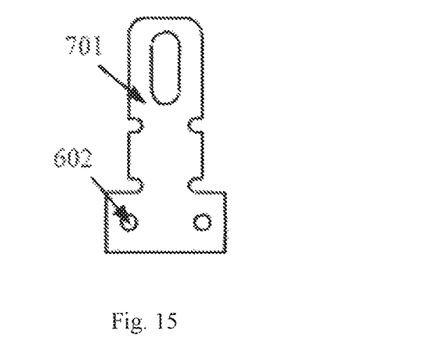
FIG. 15 is a schematic diagram showing a structure of a mounting sheet.

A mounting hole 601 is provided in the case 503, and a hole 602 is provided in the mounting sheet 701, as shown in FIG. 15. The light source circuit board 501 is fixed in the interior of the case 503 by screws. Edges of the light homogenizer plate 505 are adhered with double-face adhesives and then the light homogenizer plate 505 is mounted on the case 503. The upper cover 506 is mounted on the case 503 and the light homogenizer plate 505 is fixed. The mounting hole 602 in the mounting sheet 701 is aligned with the hole 601 in the case 503, and then are fixed using screws. The case 503 has four side surfaces, among which two opposite surfaces are provided with at least two mounting sheets 701. The light source circuit board 501 includes a PCB 402 and an LED light source units 401 soldered to the PCB 402. The card type LED driver 100 of the present invention is mounted on a side wall of the case 503, and the interface chip group included in the card type LED driver 100 in the present invention can be used for wireless communication as desired, i.e., a wireless communication transceiver may be added into the interface chip group.

In addition, the LED light source units 401 may use a blue light source. And, phosphors having afterglow effects may be provided on the LED light source units 401 or the light homogenizer plate 505, so as to alleviate the flicker of the LED. The LED lamp 500 may be applied in a transport.

The card type LED driver 100 in the present invention may be directly applied in a transport, which may be for example an automobile, an airplane, a space shuttle, a spacecraft, a satellite, a submarine, and the like. For energy saving and reduction in manufacturing and usage costs, these transports have the need to reduce the weight of themselves so as to carry more effective loads. Because the interfacing methods of the card type LED driver 100 in the present invention is very convenient to replace, the weights of the transports themselves can be reduced. For example, if the card type LED driver 100 in the present invention is applied into a lamp on a transport, one lamp can meet different lighting requirements only by carrying several drivers. Further, the card type LED driver 100 can have a flash memory built in the replaceable driver circuit board 210. The flash memory is capable of software updating via re-writing the program, and thereby quick updating can be realized. Also, by updating the driver circuit via software updating, the problem in conventional technologies that when a driver circuit is replaced, the circuit board has to be replaced as well can be avoided. As a result, materials can be saved, and meanwhile usage and replacement costs can be greatly reduced.

The circuits in the embodiments are shown for explaining the structure of the card type LED driver 100, and however, in actual application, the present invention is not limited to the above circuits. Also, the operation principles of the circuits are not the focus of the present invention.

In view of the above, the present invention has the following advantages:

1. The LED driver in the present invention is manufactured as a card-like structure, and thus miniaturization of the LED lamp driver can be realized.

2. The miniaturization of the LED driver allows more design spaces for light distribution and heat dissipation of the entire lamp.

3. By providing a card tray having a standard interface in an LED lamp, the driver circuit can be replaced as required, and the power can be selected according to actual demands. For example, the technical solutions in the present invention can provide more selections for users whose cars have modified lamps.

4. The driver circuit board can have a built-in flash memory, and thus software can be quickly updated by re-writing the program, which is like read and write of a SD card. As a result, using the technical solutions in the present invention, site operation becomes easy.

5. The card type LED driver in the present invention has built-in micro-processor/control chips, and thus intelligent controls on the lamps can be simply achieved, for example, a single lamp control, or controls after accessing a control network.

6. Even if a lamp or an LED module is damaged, the lamp or the LED module can be individually replaced, thereby bringing convenience in maintenance and reduction in usage costs of consumers.

7. Independent manufacturing and design of lamps or LED modules can be realized.

8. If the card type LED driver in the present invention is applied in a transport, the weight of the transport itself can be reduced, and thus effective load of the transport can be increased, and meanwhile energy saving and reduction in manufacturing and usage costs can be achieved.

It shall be appreciated that the above specific embodiments are illustrative, and under the teaching of the present invention, one of ordinary skill in this art can make modifications and improvements on the basis of the above embodiments, and such modifications and improvements shall fall within the claimed scope of the present invention. One of ordinary skill in this art shall appreciate that the above specific descriptions are only for explaining the present invention but not for limiting the present invention, and the protection scope of the present invention shall be defined by claims and equivalent thereof.

What is claimed is:

1. A card type LED driver, comprising:
   a card tray fixed onto an LED module or an LED lamp having an LED module so that the LED module is driven and/or controlled via an electrical interface in the card tray; and
   a replaceable driver circuit board having at least one LED driver unit which is capable of being directly driven by alternating current,
   wherein the LED driver unit comprises an input protective unit, a rectifier, and a constant current unit; and
   wherein the replaceable driver circuit board comprises an operation amplifier, wherein a positive terminal of the operation amplifier is connected to a reference voltage source, and a negative terminal of the operation amplifier is connected to a source of a switch, a gate of the switch is connected to an output terminal of the operation amplifier, a drain of the switch and between the two LEDs, wherein the replaceable driver circuit board is fixed to the card tray by insertion, so that corresponding replaceable driver circuit boards can be selectively mounted.

2. The card type LED driver according to claim 1, wherein the replaceable driver circuit board further comprises metal conductive bars and a base board, and the LED driver unit and the metal conductive bars are provided on the base board;

wherein the replaceable driver circuit board further comprises a housing defining boundaries of the base board.

3. The card type LED driver according to claim 2, wherein the housing has a bevel at a front end thereof, and at least one of both sides of the housing is provided with a groove.

4. The card type LED driver according to claim 2, wherein the housing is formed by injection molding, and the base board is stuck in the housing; or wherein the base board is directly plastic-packaged by the housing so that the housing is fixed with the base board.

5. The card type LED driver according to claim 2, further comprising an intelligent control chip group and an interface chip group.

6. The card type LED driver according to claim 5, wherein relevant electronic elements in the intelligent control chip group and the interface chip group are directly mounted on a surface of the base board.

7. The card type LED driver according to claim 5, wherein the interface chip group comprises a wireless communication transceiver therein.

8. The card type LED driver according to claim 2, wherein the metal conductive bars serve as electrical interfaces of the replaceable driver circuit board, and the number of the metal conductive bars is at least two.

9. The card type LED driver according to claim 3, wherein the card tray comprises a body, a block sheet, a conductive spring sheet and a buckle.

10. The card type LED driver according to claim 9, wherein the groove of the replaceable driver circuit board and the buckle of the card tray detachably engage with each other so that the replaceable driver circuit board is fixed in the card tray.

11. The card type LED driver according to claim 10, wherein the metal conductive bars of the replaceable driver circuit board tightly contact the conductive spring sheets of the card tray to realize electrical connections between the replaceable driver circuit board and the card tray.

12. The card type LED driver according to claim 1, wherein the LED driver unit comprises at least one of driver circuits for different powers, dimming circuits, and driver circuits for different color temperatures.

13. An LED lamp, comprising a light source circuit board, a case, a light homogenizer plate, an upper cover and a mounting sheet;

wherein the LED lamp has the card type LED driver according to claim 1.

14. The LED lamp according to claim 13, wherein the case is provided with a mounting hole, and the mounting sheet is provided with a hole.

15. The LED lamp according to claim 13, wherein the card tray is mounted on a side wall of the case.

16. The LED lamp according to claim 13, wherein the light source circuit board is fixed inside the case by a screw, the light homogenizer plate is mounted on the case by an adhesive, the upper cover is mounted on the case for fastening the light homogenizer plate, the hole in the mounting sheet is aligned with the mounting hole in the case so that the mounting sheet is fixed on the case by a screw.

17. The LED lamp according to claim 13, wherein the case has four side surfaces, among which two opposite surfaces are at least provided with two mounting sheets.

18. A transport, comprising the card type LED driver according to claim 1.

19. The transport according to claim 18, wherein a flash memory is built in the replaceable driver circuit board of the card type LED driver.

20. A transport, comprising the LED lamp according claim 12.

* * * * *